United States Patent
Buchwitz et al.

(10) Patent No.: US 8,690,177 B2
(45) Date of Patent: Apr. 8, 2014

(54) FRONT WHEEL SUSPENSION FOR A MOTOR VEHICLE

(75) Inventors: Joe L Buchwitz, Huntington Woods, MI (US); John Spencer Rezkalla, Ypsilanti, MI (US); David Burgess, Livonia, MI (US); Robert Borries, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/587,385

(22) Filed: Aug. 16, 2012

(65) Prior Publication Data

US 2014/0049017 A1    Feb. 20, 2014

(51) Int. Cl.
*B60G 3/20* (2006.01)

(52) U.S. Cl.
USPC ...... 280/124.135; 280/124.125; 280/124.143; 280/124.145

(58) Field of Classification Search
USPC ......... 280/124.135, 124.143, 124.145, 5.521, 280/5.52, 124.125
See application file for complete search history.

(56) References Cited

U.S. PATENT DOCUMENTS

| | | | | |
|---|---|---|---|---|
| 3,999,779 | A * | 12/1976 | Bishop | 280/5.521 |
| 4,723,791 | A * | 2/1988 | Miura et al. | 280/124.109 |
| 5,048,860 | A * | 9/1991 | Kanai et al. | 280/86.757 |
| 5,292,149 | A * | 3/1994 | Luger | 280/5.521 |
| 5,335,933 | A | 8/1994 | Yamamoto et al. | 280/675 |
| 5,348,337 | A * | 9/1994 | Ando | 280/124.143 |
| 5,421,606 | A | 6/1995 | Chun | 280/691 |
| 5,496,055 | A * | 3/1996 | Shibahata et al. | 280/124.141 |
| 5,873,587 | A * | 2/1999 | Kawabe et al. | 280/124.135 |
| 5,938,219 | A * | 8/1999 | Hayami et al. | 280/124.135 |
| 5,975,541 | A * | 11/1999 | Harara et al. | 280/5.524 |
| 6,027,130 | A * | 2/2000 | Kawabe et al. | 280/124.135 |
| 6,062,580 | A * | 5/2000 | Kawabe et al. | 280/124.145 |
| 6,099,005 | A * | 8/2000 | Wakatsuki | 280/124.135 |
| 6,116,627 | A * | 9/2000 | Kawabe et al. | 280/124.15 |
| 6,302,420 | B1 * | 10/2001 | Sano | 280/124.134 |
| 6,719,314 | B1 * | 4/2004 | Schote | 280/124.135 |
| 7,222,863 | B2 * | 5/2007 | Deal et al. | 280/5.521 |
| 7,281,716 | B2 * | 10/2007 | Fanson | 280/5.52 |
| 7,325,820 | B2 * | 2/2008 | Allen et al. | 280/124.15 |
| 7,431,315 | B2 * | 10/2008 | Jargowsky et al. | 280/124.128 |
| 7,467,800 | B2 * | 12/2008 | Houser et al. | 280/5.521 |
| 7,789,406 | B2 * | 9/2010 | Matsuoka | 280/124.135 |
| 7,967,310 | B2 * | 6/2011 | Frasch et al. | 280/124.143 |
| 8,056,912 | B2 * | 11/2011 | Kawabe et al. | 280/124.135 |
| 8,087,682 | B2 * | 1/2012 | Natsukari et al. | 280/124.143 |
| 8,152,185 | B2 * | 4/2012 | Siebeneick | 280/124.134 |
| 8,267,416 | B2 * | 9/2012 | Allen et al. | 280/124.135 |
| 8,408,568 | B2 * | 4/2013 | Yanagida | 280/124.128 |
| 2005/0280241 | A1 * | 12/2005 | Bordini | 280/124.135 |
| 2006/0290088 | A1 * | 12/2006 | Luttinen et al. | 280/93.51 |
| 2008/0067773 | A1 * | 3/2008 | Chalin et al. | 280/124.135 |

(Continued)

FOREIGN PATENT DOCUMENTS

JP    63013828    1/1988    ............ B60K 25/04

*Primary Examiner* — Nicole Verley

(74) *Attorney, Agent, or Firm* — L.C. Begin & Associates, PLLC

(57) ABSTRACT

A wheel suspension for a motor vehicle includes a carrier coupled to a portion of the vehicle, and a wheel bearing element mounted on the carrier so as to be rotatable about an axis, wherein a first portion of the carrier is rotatably coupled to the portion of the vehicle by a single link.

12 Claims, 7 Drawing Sheets

(56) References Cited

U.S. PATENT DOCUMENTS

| | | | |
|---|---|---|---|
| 2010/0270768 A1* | 10/2010 | Holland et al. | 280/124.135 |
| 2010/0320711 A1* | 12/2010 | Siebeneick | 280/124.125 |
| 2011/0115185 A1* | 5/2011 | Csik | 280/124.125 |
| 2012/0043736 A1* | 2/2012 | Okamoto et al. | 280/124.135 |
| 2012/0242055 A1* | 9/2012 | Starck et al. | 280/124.145 |

* cited by examiner

FRONT WHEEL SUSPENSION FOR A MOTOR VEHICLE

BACKGROUND OF THE INVENTION

The present invention relates to a wheel suspension system for a motor vehicle. In front-wheel drive and all-wheel drive passenger cars, it is desirable to minimize the height of the vehicle hood for styling reasons. However, in most suspension designs, it is necessary to position the suspension spring/damper assembly above the wheel half-shaft. This positioning of the suspension spring/damper assembly requires a certain amount of vertical space above the half-shaft, resulting in a relatively higher hood placement. In addition, in order to minimize hood height, it is desirable to decrease or minimize spindle height. However, the spindle height affects the wheel suspension caster stiffness and the wheel recession rate. More specifically, as the spindle height is reduced, it becomes increasingly difficult to maintain a desired caster stiffness without excessively degrading the wheel recession rate.

In view of the above, it is desirable to provide a wheel suspension architecture that facilitates minimization of the spindle height and which enables positioning of the suspension spring/damper assembly offset from the half-shaft.

SUMMARY OF THE INVENTION

In one aspect of the embodiments of the present invention, a wheel suspension for a motor vehicle is provided. The suspension includes a carrier coupled to a portion of the vehicle, and a wheel bearing element mounted on the carrier so as to be rotatable about an axis, wherein a first portion of the carrier is rotatably coupled to the portion of the vehicle by a single link.

DETAILED DESCRIPTION

Figure 1:
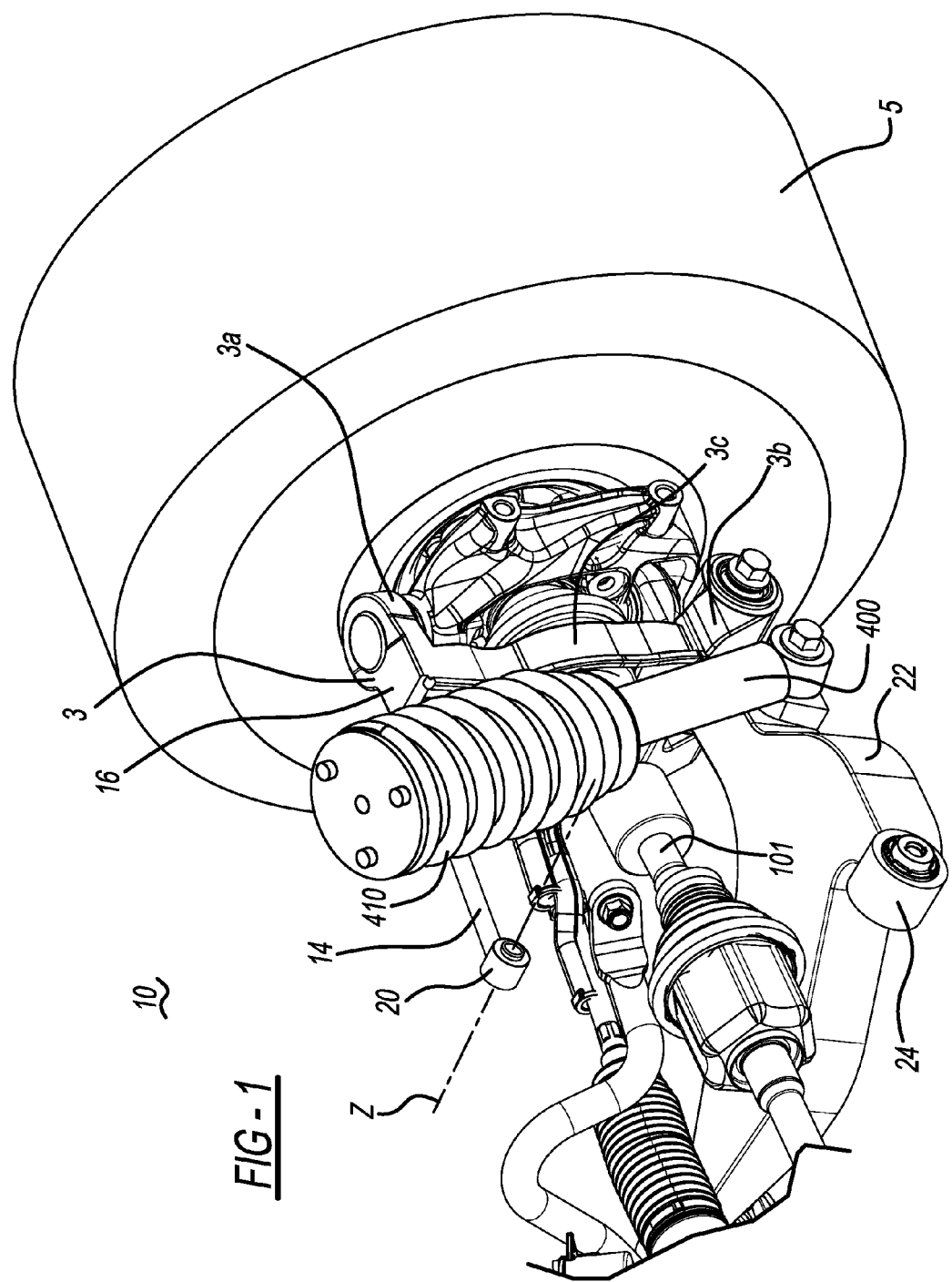
FIG. 1 is a perspective view of a wheel suspension in accordance with an embodiment of the present invention.
Figure 2:
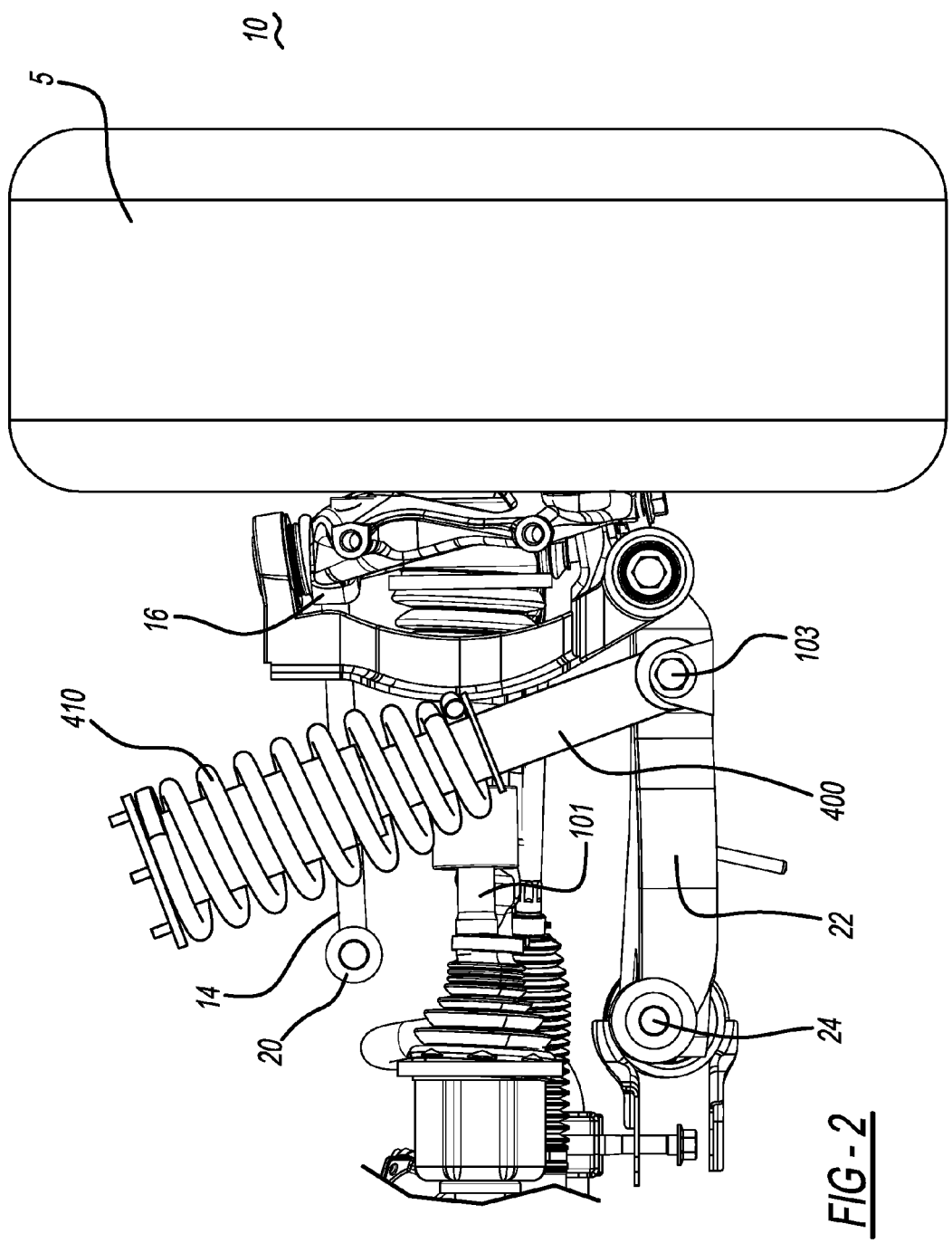
FIG. 2 is a front view of the embodiment shown in FIG. 1.
Figure 3:
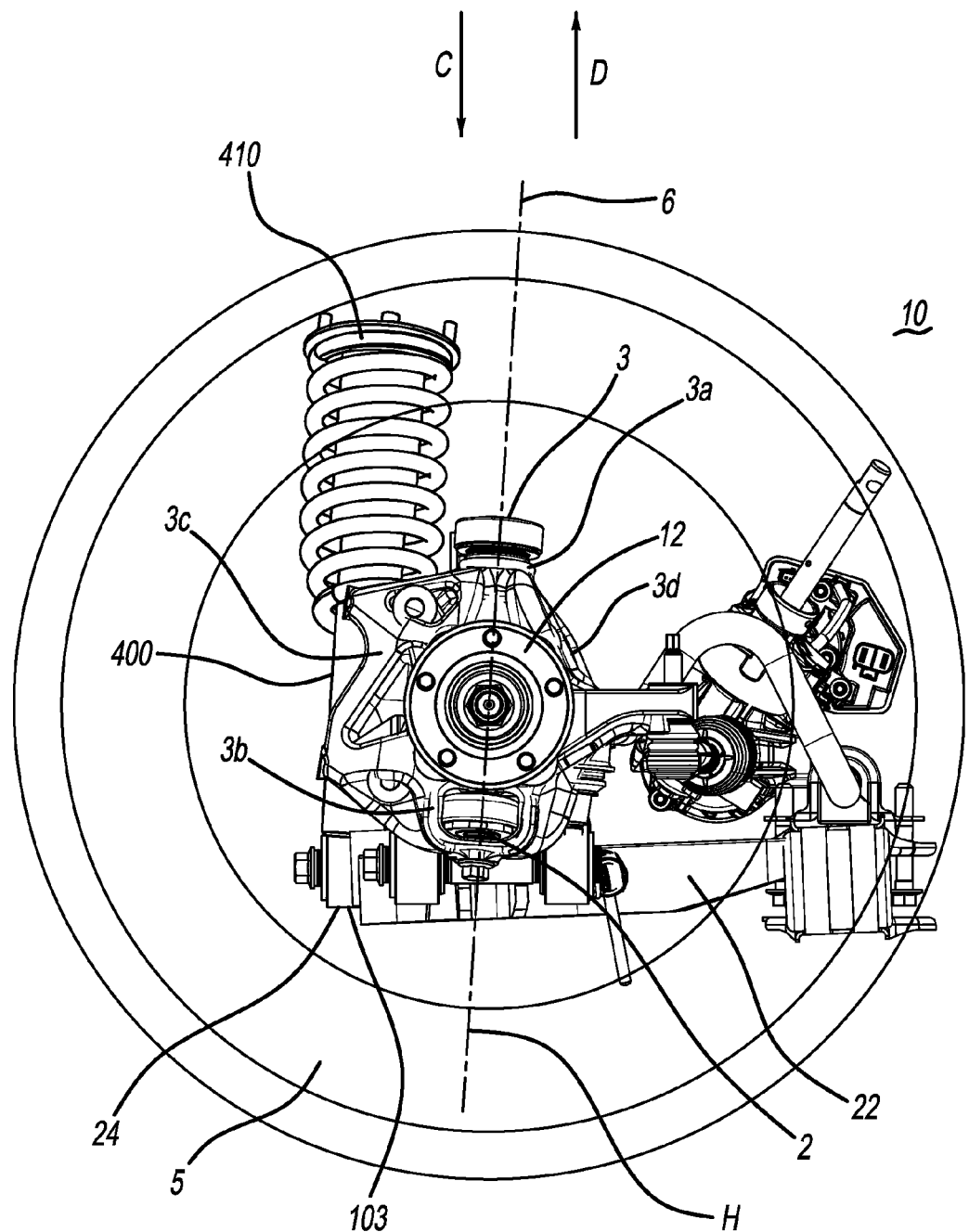
FIG. 3 is a side view of the embodiment shown in FIG. 1.

FIGS. 1-6 show a vehicle suspension assembly 10 in accordance with one embodiment of the present invention. The vehicle suspension assembly 10 may be utilized in any of a variety of vehicles. As used herein, the term "vehicle" is understood to encompass any means in or by which someone travels or something is carried or conveyed; a means of conveyance or transport. Although the embodiments of the present invention can be utilized on a variety of specific suspension designs, both front and rear, in one embodiment it is contemplated that the present invention be utilized on an automotive rear suspension.

Referring to FIGS. 1-6, the automotive suspension assembly 10 includes a vehicle suspension sub-frame 18 and a vehicle wheel bearing element 12 structured for mounting a vehicle wheel thereon and operatively coupled to the sub-frame 18 (or to another portion of the vehicle) via a first member or lower control arm 22, a carrier 3 and an upper control link 14. First member 22 may be rotatably coupled to the sub-frame 18 or to another portion of the vehicle. Upper control link 14 may be rotatably coupled to the vehicle body or to another portion of the vehicle. Carrier 3 is coupled to first member and to upper control link 14 in the manner described herein. In the embodiment shown in FIGS. 1-6, wheel bearing element 12 is a steering knuckle. In an alternative embodiment, wheel bearing element 12 is a spindle.

Knuckle 12 is structured for mounting a vehicle wheel 5 thereon, in a known manner. In one embodiment, first member 22 is in the form of a lower control arm pivotably coupled to a sub-frame 18 of the vehicle. Control arm 22 is rigid and includes attachment portions for facilitating connection between the control arm 22 and sub-frame 18 and also between the control arm and other elements of the suspension. The attachment portions may, for example, be in the form of clevises, single shear attachments and/or mount joints, formed as portions of the lower control arm 22 and configured for receiving therein couplings for rotationally attaching the lower control arm to sub-frame 18 and to other elements of the suspension. The attachment portions may also have forms other than those listed above, depending on the connection and operational requirements of a particular application.

Lower control arm 22 may be configured as an "H"-arm, an "A"-arm, or the control arm may have any other suitable configuration of appropriate stiffness and structure. In the embodiment shown in FIGS. 1-6, control arm 22 is configured as a structural "A"-arm.

In the embodiments described herein, when a rotational connection is described herein as being positioned "outboard" of another rotational connection or "inboard" of another rotational connection with respect to vehicle fore-aft axis E (FIG. 6) or with respect to vertical plane G, the pertinent features used for determining the relative positions of the rotational connections are the intersection of a plane bisecting the bushing and the bushing rotational axis (for a bushing) and the rotational center of the ball joint (for a ball joint). Thus, for example, where a bushing is described as being positioned outboard of a ball joint with respect to plane G, this is understood to mean that the intersection of a plane bisecting the bushing and the bushing rotational axis is positioned outboard of the rotational axis of the ball joint.

The lower control arm 22 is rotatably connected to the vehicle sub-frame 18 via at least one rotatable connection. In the embodiment shown in FIG. 6, the lower control arm 22 is rotatably connected to the vehicle sub-frame 18 via first and second rotational connections 26 and 24, respectively. Although a variety of rotational connections 24 and 26 are contemplated, one particular embodiment contemplates the use of a relatively stiff bushing (such as a conventional symmetric bushing) for connection 24. In addition, one particular embodiment contemplates the use of asymmetric bushings for connections 26 to rotatably connect control arm 22 to sub-frame 18. It has been found that the use of an asymmetric bushing to connect the lower control arm 22 to the vehicle bodywork aids in providing both a desired wheel recession rate and a desired caster stiffness. It has been found that these effects help offset the impact of the spindle height on wheel recession and caster stiffness, thereby facilitating minimization of the spindle height. The shortening of the spindle height helps enable the reduction of vehicle hood height. As used herein, the term "asymmetric bushing" refers to a bushing having an asymmetric force response, the bushing being configured such that the stiffness of the bushing is dependent on the directions of the forces acting on the portion of the suspension coupled to the vehicle via the bushing (i.e., the directions of the forces acting through or transmitted through the bushing).

In a particular embodiment of the present invention, the asymmetric hushing 26 connecting the lower control arm 22 to the vehicle frame are structured to be relatively "soft" (i.e., to have a relatively lower stiffness responsive to forces and force components acting along the vehicle fore-aft axis or along axes parallel to the vehicle fore-aft axis, to provide a softer ride and to aid in providing a desired wheel recession rate. In addition, the bushings 26 are also structured to have a relatively greater stiffness responsive to forces and force components acting vertically with respect to the vehicle fore-aft axis (including forces acting in vertical directions (indicated by arrows C and D in FIG. 3)), to provide improved handling characteristics and to aid in providing the desired caster stiffness and brake torque/wind-up stiffness. The structures of the asymmetric bushing aids in resolving the conflicting bushing force response requirements previously described, by tailoring the bushing force response to the orientation of the threes acting on the bushing. One example of an asymmetric bushing is a known bushing having an elastomeric material positioned between inner and outer rings of the bushing, with gaps formed in portions of the elastomeric to provide a relatively lower stiffness along axes passing through the gaps, while maintaining a relatively greater stiffness along axes passing through the elastomeric. Other types of asymmetric bushings may also be used.

Figure 6:
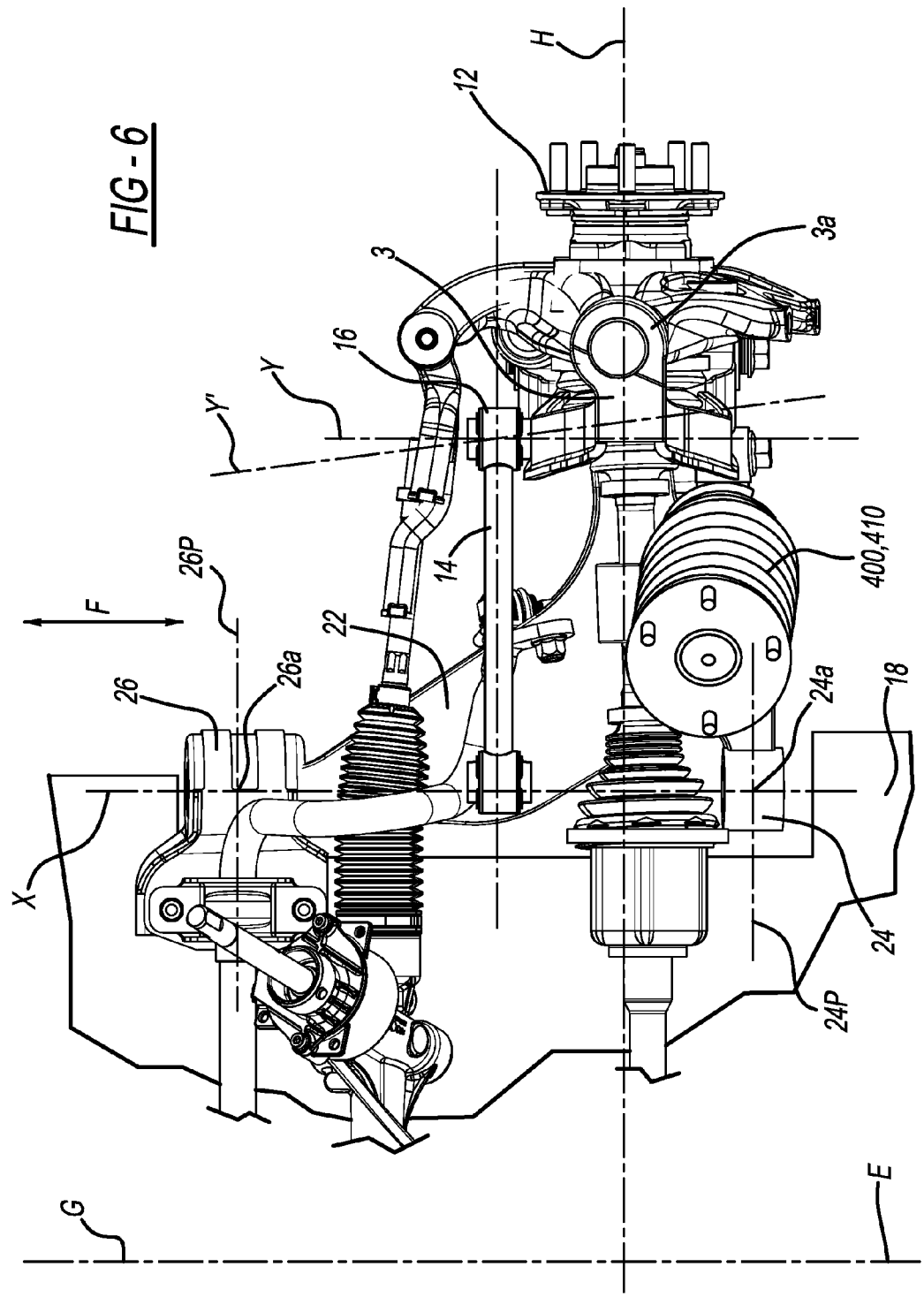
FIG. 6 is a plan view of the embodiment shown in FIG. 1.

Referring to FIG. 6, a first rotational axis X may be defined as an axis extending through a point 26a located at an intersection of a plane 26P bisecting the bushing 26 with the bushing rotational axis and also through a point 24a defined by the intersection of a plane 24P bisecting the bushing 24 with the bushing rotational axis. Thus, the first rotational connection 26 and the second rotational connection 24 are positioned along first axis X. Lower control arm 22 rotates with respect to the sub-frame 18 about axis X during movement of the suspension due to jounce and rebound. FIG. 6 shows a vertical plane G extending through the vehicle fore-aft axis E. The vehicle fore-aft axis E is generally understood to extend along a longitudinal centerline of the vehicle in a first direction in which the vehicle would travel when its front or guiding wheels are straightened, and in a second direction opposite the first direction. It will be understood that the position of axis E shown in FIG. 6 is not the actual position of the axis with respect to the elements of the vehicle shown in the Figure. Thus, the spacing between axis E/plane G and the other vehicle elements shown in FIG. 6 does not reflect the actual spacing between fore-aft axis E/plane G and these vehicle elements. Rather, the plane G and axis E are shown in this view to indicate their orientations with respect to axis X and other elements and features to which they may be referenced.

In the embodiment shown herein, the vehicle fore-aft axis E extends in the directions indicated by arrows F. Also, in this embodiment, first axis X extends essentially parallel to plane G. In this manner, the embodiment shown provides a first member (in this embodiment, lower control arm 22) pivotably coupled to a portion of the vehicle (in this embodiment, the vehicle sub-frame 18) so as to be pivotable about first axis X which is parallel to a vertical plane G extending through a fore-aft axis E of the vehicle.

Figure 5:
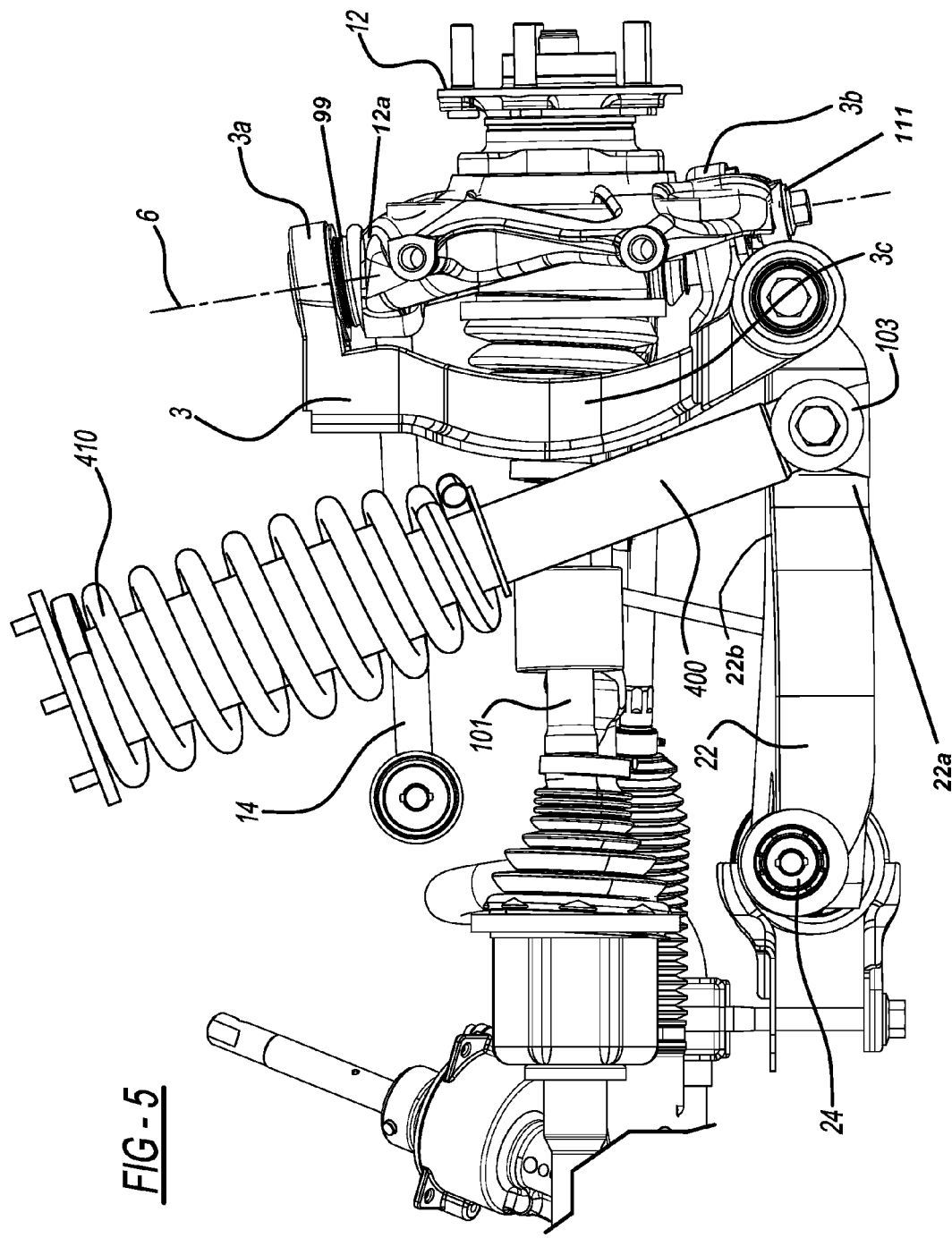
FIG. 5 is the view of FIG. 2 with the vehicle wheel omitted.

FIG. 5 shows a schematic view of a wheel suspension according to one embodiment of the present invention, as viewed from the front of the vehicle. The wheel suspension connects a wheel 5 of a motor vehicle to the body (not shown) of the vehicle. The wheel 5 is mounted on steering knuckle 12 by means of its horizontal axle (not shown) so as to be rotatable. In the embodiments of the present invention, the steering knuckle 1 is mounted in a forked carrier 3 so as to be rotatable about a steering axis 6.

The steering axis orientation may vary from the vertical by an amount equal to the kingpin angle, defined herein as the angle between the steering axis and a vertical plane along the direction of the vehicle fore-aft axis and passing through the tire centerline at ground level, when viewed from the front or rear of the vehicle along a direction parallel to the vehicle fore-aft axis. In one embodiment, this variation is in the range of 5-15 degrees.

The steering axis orientation may also vary from the vertical by an amount equal to the caster angle, defined herein as the angle between the steering axis and a vertical plane extending perpendicular to the vehicle fore-aft axis and through the wheel centerline. In one embodiment, this variation is in the range of 2-10 degrees.

This mounting structure is described in U.S. Published Application Nos. 2004/0140640 and 2003/0234504, the contents of which are incorporated herein by reference in their entireties. In one embodiment, a plane (represented by H in FIG. 6) including the steering axis 6 and extending orthogonally from vertical plane G passing through the vehicle fore-aft axis E passes through the rotational axis of the wheel 5.

Figure 7:
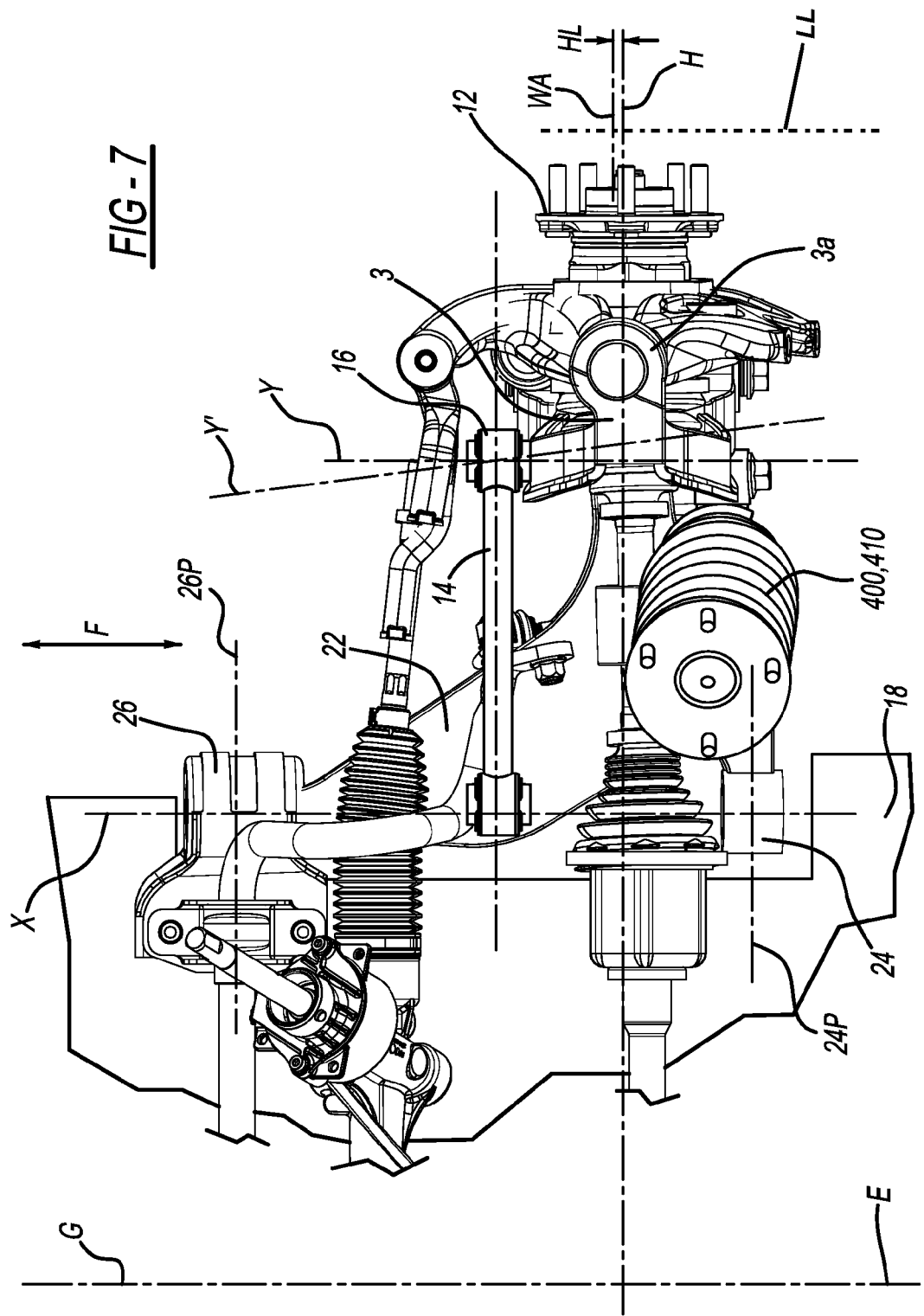
FIG. 7 is a plan view of a wheel suspension in accordance with another embodiment of the present invention.

In another embodiment (shown in FIG. 7), the plane H including the steering axis 6 and extending orthogonally from vertical plane G is offset from the wheel rotational axis WA by an amount equal to the hub-lead HL, which is defined as the distance between the wheel rotational axis and the plane H, along a line LL extending parallel to the fore-aft axis E. In a particular embodiment, the hub lead HL is within the range 0-30 millimeters. In a more particular embodiment, the hub lead HL is within the range 0-15 millimeters. In a particular embodiment having a hub lead HL within the range 0-15 millimeters, the vehicle is a front wheel drive vehicle. In a particular embodiment having a hub lead HL within the range 0-30 millimeters, the vehicle is a rear wheel drive vehicle.

In the embodiment shown in FIGS. 1-6, carrier 3 has a first portion 3a, a second portion 3b, and a pair of connecting portions 3c and 3d connecting the first portion with the second portion. Connecting portions 3c and 3d extend from first portion 3a and diverge outwardly to form a passage 3e therebetween configured for permitting a portion of a half shaft 101 to extend therethrough, to connect in a known manner to steering knuckle 12. Connecting portions 3c and 3d then connect to the second portion.

The carrier 3 is coupled at first portion 3a to the sub-frame 18 or another portion of the vehicle via an upper link 14 (described in greater detail below). In addition, the second portion 3b at a lower end of the carrier 3 is connected to the sub-frame 18 (or another portion of the vehicle) via lower control arm 22. Although a variety of rotational connections are contemplated for connecting the second portion 3b of carrier 3 to the first member 22, one embodiment contemplates the use of a revolute joint 2 for the connection. This coupling of the carrier 3 to the sub-frame or bodywork via the upper link 14 and first member 22 reduces the number of degrees of freedom of the carrier, which gives rise to additional isolation and increased stiffness. In other embodiments, however, alternative rotational attachments are contemplated.

Although a variety of rotational connections 99 are contemplated for connecting the top portion 12a of the steering knuckle 12 to carrier 3, one embodiment contemplates the use of a standard ball-and-socket joint for the connection. In other embodiments, however, alternative rotational attachments are contemplated. Also, although a variety of rotational connections 111 are contemplated for connecting the bottom portion 12b of the steering knuckle 12 to the carrier 3, one embodiment contemplates the use of a roller bearing for the connection 111. In other embodiments, however, alternative rotational attachments are contemplated.

Figure 4:
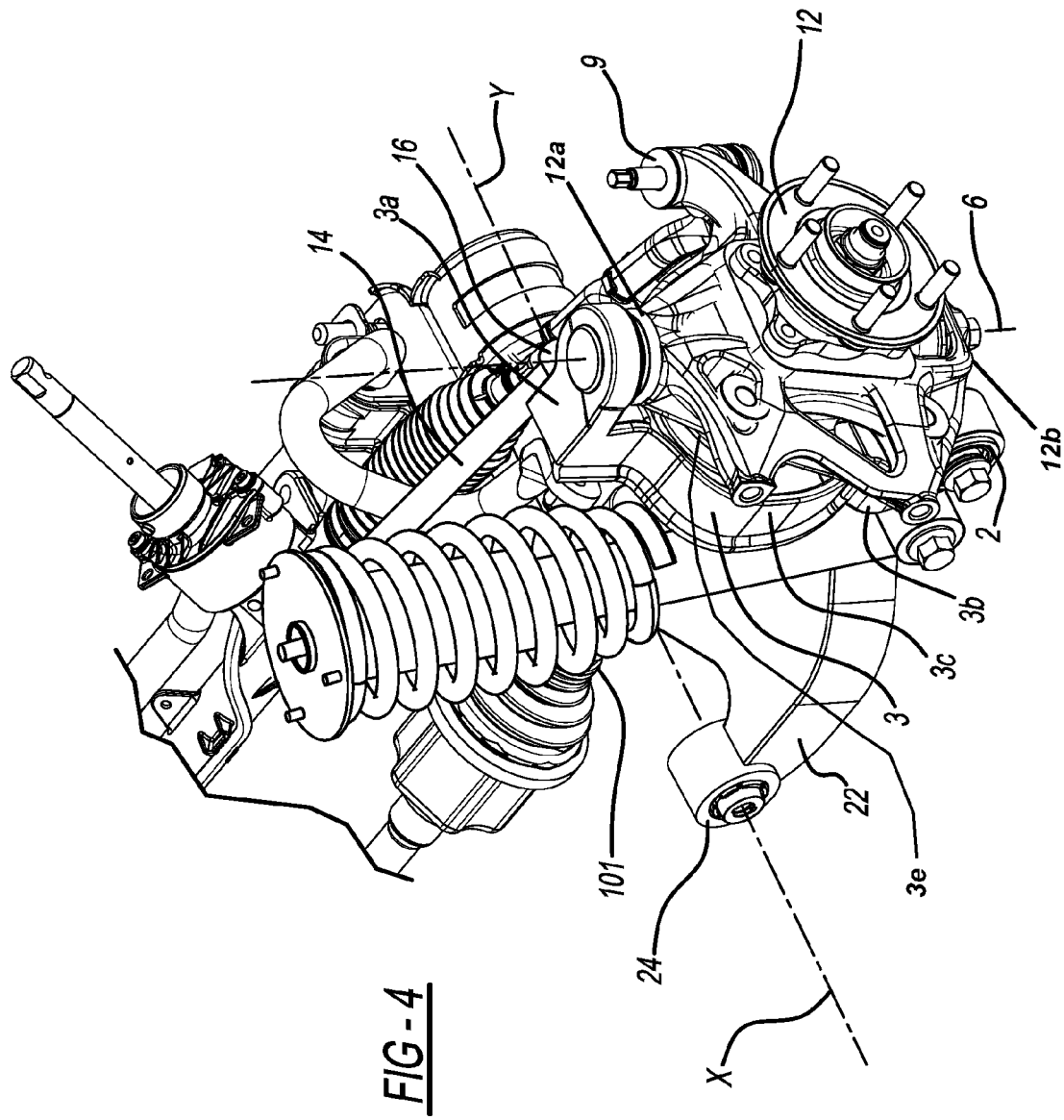
FIG. 4 is a perspective view of a portion of the embodiment shown in FIG. 1 with the vehicle wheel omitted.

FIG. 4 shows a portion of the embodiment of the wheel suspension just described in perspective view. Also visible on the steering knuckle 1 is a lug 9, to which a tie rod or a further link element for a track rod can be attached.

Referring to FIGS. 1-6, the upper part 3a of the carrier 3 is connected to the sub frame 18 (or to another portion of the vehicle) with a single upper link 14. The upper link 14 is rotatably connected to carrier 3 via a rotational connection 16 structured to permit some displacement along the axis of rotation to accommodate caster change and wheel-end recession/precession. Although a variety of rotational connections 16 are contemplated, one particular embodiment contemplates the use of a bushing having a rotational axis Y oriented parallel to the vehicle fore-aft axis E. The bushing allows the carrier 3 and the knuckle mounted thereto to move in a vertical direction relative to the vehicle during operation while still receiving support from the upper link 14.

Referring to FIGS. 1-6, upper link 14 is also rotatably connected to sub-frame 18 via a rotational connection 20. Although a variety of rotational connections 20 are contemplated, one embodiment contemplates the use of a bushing having a rotational axis Z oriented parallel to the vehicle fore-aft axis F and structured to permit some displacement along the bushing axis of rotation to accommodate caster change and wheel-end recession/precession. The bushing allows the carrier 3 and the knuckle mounted thereto to move in a vertical direction relative to the vehicle during operation while still receiving support from the upper link 14. The upper link 14 reacts mainly to lateral forces acting on carrier 3. In addition, the geometry of the upper link 14 and/or the locations of its connections to sub-frame 18 and/or carrier 3 may be configured so as to provide a desired degree of camber gain.

Thus, in the embodiments described herein, the steering knuckle 12 is operatively coupled to the lower control arm 22 and the upper link 14 via the carrier 3. The carrier 3 reacts to forces exerted by the wheel laterally and in directions parallel to the vehicle fore-aft axis. The carrier as coupled to the vehicle frame by the lower control arm 22 and the upper link 14 also allows vertical motion of the knuckle 12. The knuckle 12 is mounted so as to be rotatable about the steering axis 6 extending through the carrier 3, for purposes of steering. In this arrangement, upper link 14 is utilized for camber control. The caster stiffness provided by the lower control arm structure and mounting described herein enables the use of a single upper link 14 to couple the carrier 3 to the vehicle frame.

The wheel suspension architecture described above enables the suspension spring/damper assembly 400/410 to be rotationally connected to the lower control arm 22 either in front of or behind the half-shaft 101. Thus, the spring/damper assembly 400/410 does not need to be mounted over the half-shaft 101, due to the improved packaging provided by the single link upper control arm. The springs and dampers can be positioned as low on the vehicle as the vehicle ground clearance allows. The upper mounts of springs 410 may be connected to the sub frame 18 or directly to the vehicle body. The upper mounts of the dampers 400 are connected to the vehicle body.

In a particular embodiment, the spring/damper assembly 400/410 is rotationally connected via a joint 103 to the lower control arm 22 along a side edge 22a of the arm. In this embodiment, a portion of the size envelope of the joint resides within the thickness envelope of the control arm. This enables the spring/damper assembly 400/410 to reside in a lower position than would be the case if the spring/damper assembly 400/410 were connected to control arm 22 along an upper surface 22b of the arm. In an embodiment where the spring elements 410 are positioned separately from the dampers 400, both the springs and the dampening elements may be positioned either in front of or behind the half-shaft 101.

Retelling to FIG. 6, in a particular embodiment, axis Y and axis X are not parallel to each other. Rather, the orientation of upper link 14 and/or the rotational connection 16 and the rotational connection connecting the upper link to the sub-frame are arranged so as to produce a three-dimensional skewing of axis Y with respect to axis X, as indicated by dashed axis Y' shown in FIG. 6, for example when viewed from above the vehicle. This skewing promotes caster gain by forcing the carrier and steering knuckle to rotate. By adjusting the easier gain in this manner, the suspension anti-properties such as anti-lift, anti-squat, anti-dive) can be correspondingly tuned or adjusted. Depending on the desired effect on anti-properties, the skew of axis Y' with respect to axis X may be in the range of 0-40 degrees. As used herein, the term "skewed" is understood to mean "having an oblique direction or position. As used herein, the term "oblique" is understood to mean neither perpendicular nor parallel to a given line or surface; slanting or sloping." The skew angle may be measured by intersecting a line parallel to the Y' axis with the X axis and measuring the include angle between the X and Y' axes along a plane including both axes.

In summary, the embodiments of the wheel suspension architecture described herein enable a relatively low spring/damper position and location of the spring/damper assembly offset from the half-shaft. In addition, the embodiments of the wheel suspension architecture described herein enable a relatively short spindle height to be achieved while also enabling decoupling and optimizing of suspension characteristics such as caster stiffness and recession rate.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A wheel suspension for a motor vehicle, the suspension comprising:
a carrier having a wheel bearing element mounted thereon, the carrier being coupled to a portion of the vehicle by a lower control arm; and
a damper rotationally connected to the control arm along a side edge of the arm,
wherein the wheel bearing element is connected to a first portion of the carrier by a ball-and-socket joint, and
wherein the wheel bearing element is connected to a second portion of the carrier by a rotational connection permitting rotation of the wheel bearing element about a vertical axis while constraining rotation of the wheel bearing element about any other axis.

2. A wheel suspension for a motor vehicle, the suspension comprising:
a carrier having a wheel bearing element mounted thereon, the carrier being coupled to a portion of the vehicle by a lower control arm; and a damper rotationally connected to the control arm along a side edge of the arm, wherein a first portion of the carrier is rotatably coupled to a portion of the vehicle by a single link, and wherein the single link is rotatably connected to the portion of the vehicle by a bushing having a rotational axis oriented parallel to the vehicle fore-aft axis and structured to permit displacement along the bushing rotational axis.

3. A wheel suspension for a motor vehicle, the suspension comprising:

a carrier coupled to a portion of the vehicle; and a wheel bearing element mounted on the carrier so as to be rotatable about an axis, wherein a first portion of the carrier is rotatably coupled to the portion of the vehicle by a single link, wherein a second portion of the carrier is rotatably coupled to a portion of the vehicle by a lower control arm; and wherein a first and a second rotational connections connect the lower control arm to the portion of the vehicle to which the lower control arm is connected, a line extending through rotational axes of the connections of the first and a second rotational connections defines a first axis extending parallel with a fore aft axis of the vehicle, a third rotational connection connects the link to the portion of the vehicle to which the link is connected, and a line extending through a rotational axis of the third rotational connection defines a second axis, and wherein the second axis is skewed with respect to the first axis.

4. A wheel suspension for a motor vehicle, the suspension comprising:

a carrier having a wheel bearing element mounted thereon, the carrier being coupled to a portion of the vehicle by a lower control arm; and a damper rotationally connected to the control arm along a side edge of the arm, wherein the wheel bearing element is connected to a first portion of the carrier by a revolute joint.

5. The suspension of claim 4 wherein the lower control arm is connected to the portion of the vehicle by at least one asymmetric bushing.

6. The suspension of claim 5 wherein the at least one asymmetric bushing has a relatively lower stiffness responsive to forces acting along axes parallel to a fore-aft axis of the vehicle and a relatively greater stiffness responsive to forces acting with respect to the vehicle fore-aft axis.

7. The suspension of claim 4 wherein the wheel bearing element comprises a steering knuckle.

8. The suspension of claim 4 wherein the wheel bearing element comprises a spindle.

9. The suspension of claim 4 wherein the damper is connected to the control arm forward of a half-shaft operatively coupled to a wheel of the vehicle.

10. A wheel suspension for a motor vehicle, the suspension comprising:

a carrier coupled to a portion of the vehicle; and a wheel bearing element mounted on the carrier so as to be rotatable about an axis, wherein a first portion of the carrier is rotatably coupled to the portion of the vehicle by a single link, wherein a first plane intersecting a steering axis and extending orthogonally from a second, vertical plane passing through a fore-aft axis of the vehicle is offset from a rotational axis of the wheel along a line LL extending parallel to the vehicle fore-aft axis.

11. The suspension of claim 10 wherein the offset is in the range of 0-30 millimeters.

12. The suspension of claim 11 wherein the offset is in the range of 0-15 millimeters.

* * * * *